United States Patent [19]

Mikeska

[11] 3,762,644

[45] Oct. 2, 1973

[54] STRESS RELIEF GROOVES FOR PYROLYTIC GRAPHITE COATED ROCKET NOZZLE INSERTS

[75] Inventor: Alan J. Mikeska, Annandale, Va.

[73] Assignee: The United States of America as represented by the Secretary of the Air Force

[22] Filed: May 11, 1970

[21] Appl. No.: 48,763

[52] U.S. Cl. .......................................... 239/265.11
[51] Int. Cl. ............................................ B63h 11/00
[58] Field of Search ..................... 239/127.1, 127.3, 239/265.11

[56] References Cited

UNITED STATES PATENTS 3,305,178  2/1967  Parilla .............................. 239/132.5
3,309,026  3/1967  Loprete ................................. 60/260

Primary Examiner—Samuel Feinberg
Attorney—Harry A. Herbert, Jr. and Arsen Tashjian

[57] ABSTRACT

A method of preventing delamination of the pyrolytic graphite coating of a rocket nozzle insert during fabrication and operation. The method includes the steps of forming a circumferential stress relief groove on the entrance end face of the substrate material portion of the rocket nozzle insert near the pyrolytic graphite coating-substrate material interface, and of forming a similar circumferential stress relief groove on the exit end face of the same substrate portion near the pyrolytic graphite coating-substrate material interface, with each groove defining a separate circle the geometric center of each of which is on the central axis of the rocket nozzle insert, which axis is coincident with the longitudinal axis of the rocket nozzle of which the insert is to be a component part. The grooves give flexibility to the substrate material portion near the interface with the pyrolytic graphite coating, and thereby prevent high interlaminar sheer stresses from developing.

8 Claims, 3 Drawing Figures

INVENTOR.
ALAN J. MIKESKA
BY Harry A. Herbert Jr.
and
Arsen Tashjian
ATTORNEYS

STRESS RELIEF GROOVES FOR PYROLYTIC GRAPHITE COATED ROCKET NOZZLE INSERTS

BACKGROUND OF THE INVENTION

This invention relates to a pyrolytic graphite coated rocket nozzle insert and, more particularly, to a method of preventing the delamination of the pyrolytic graphite coating on the insert.

The nozzle of some conventional rockets is of a composite structure. That is, the nozzle is composed of a plurality of inserts of different materials. This composite insert type of structure is preferred and may be necessary to attain the thermal and mechanical properties which are not obtainable when only one material, in one piece, is used in structuring the entire nozzle. Such rocket nozzle inserts are prepared, of necessity, from materials which will withstand considerable erosion and high temperature service. One such type of rocket nozzle insert is prepared by coating a substrate materail with pyrolytic graphite (hereinafter referred to as "PG"). PG is a form of graphite which is produced by a high temperature pyrolysis or decomposition of carbon-containing vapors. The PG has a stratified, i.e., laminar, structure. Unfortunately, due to interlaminar shear stress near the ends of the PG coating on substrate materials, failure of the PG coating on the rocket nozzle insert by delamination (i.e., shearing) may occur during fabrication of the nozzle insert or, worse, during actual use of the insert in a rocket nozzle.

As a related matter, it is to be noted that PG coatings are limited by the present state-of-the-art to thicknesses of approximately 0.06 inch when deposited on standard, i.e., conventional, substrate materials.

What is needed, and is not known in the art, is a method of preventing the delamination of the PG coating on a rocket nozzle insert and, indirectly thereby, of permitting the deposition of a coating of PG of a thickness in excess of 0.06 inch on the substrate material used in the fabrication of the rocket nozzle insert.

This invention fulfills this current critical need and, therefore, constitutes a significant advance in the state-of-the-art.

SUMMARY OF THE INVENTION

This invention relates to a method of preventing the delamination of the PG coating on a rocket nozzle insert during fabrication and during operation, i.e., during actual use in a nozzle.

Accordingly, the principal object of this invention is to prevent the delamination of the PG coating on the insert during fabrication and operation.

Obviously, a related object of this invention is to permit the deposition of a coating of PG of increased thickness, i.e., in excess of 0.06 inch thickness, on conventional substrate material used in fabricating a rocket nozzle insert.

These objects, and still other and related ones, of this invention will become readily apparent after a consideration of the description of the invention and reference to the drawings.

DESCRIPTION OF THE PREFERRED EMBODIMENT

Figure 1:
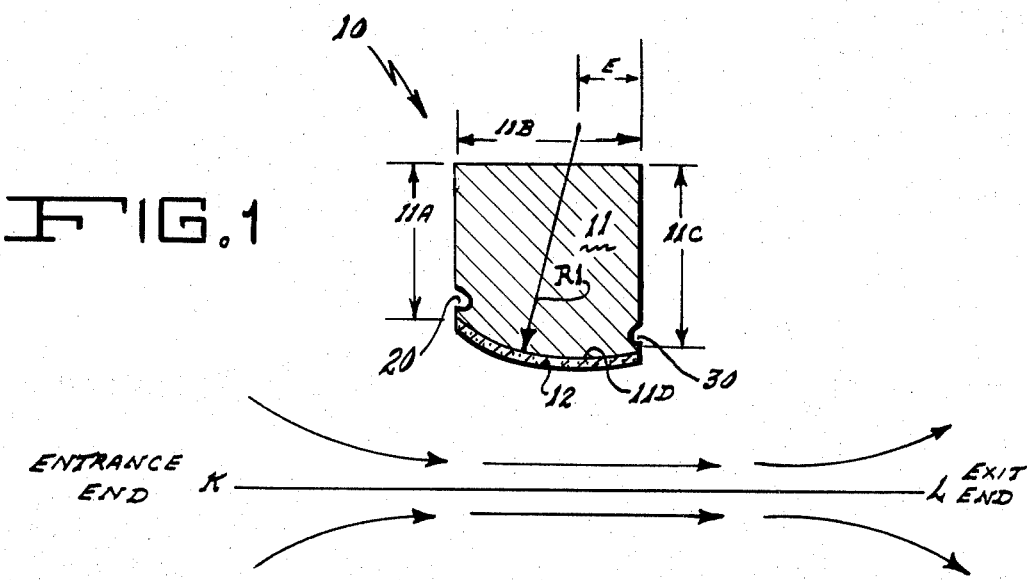
FIG. 1 is a side elevation view, in cross-section, and in schematic form, of a typical rocket nozzle insert, with a PG coating, embodying the inventive concept.

In FIG. 1 is depicted, in side elevation view and in schematic form, a cross-sectional representation of a typical rocket nozzle insert which embodies the inventive concept. At this point it is well to point out that, while it is conventional in the art to represent a nozzle insert in the manner depicted in FIG. 1, it is to be remembered that nozzle inserts, such as the one shown, are of general annular shape in structure. Therefore, to those not in the art, what is depicted in FIG. 1 would have to be more accurately described as the cross-section of the upper portion of the annular shaped nozzle insert. However, in the interest of simplicity and brevity, and consistent with art-accepted practices, what is depicted in FIG. 1 will be referred to hereinafter, as heretofore, as a side elevation view, in cross-section and in schematic form, of a typical rocket nozzle insert. Additionally, it is also of importance to point out that in cross section the typical nozzle insert has four surfaces, three of which are external and uncoated, and the fourth of which is internal and as further described below is coated. Further, the central axis (also referred to as the "insert axis") of the rocket nozzle insert typically coincides with the longitudinal axis of the nozzle proper of which it is a component part.

Again with reference to FIG. 1, therein is shown rocket nozzle insert 10 which includes: substrate material 11 with entrance end external radial surface 11A (hereinafter referred to as the "entrance end face" of the nozzle insert), external longitudinal surface 11B, exit end external radial surface 11C (hereinafter referred to as the "exit end face" of the nozzle insert), and internal longitudinal surface 11D; entrance end face circumferential groove or slot 20; exit end face circumferential groove or slot 30; and PG coating 12. Also shown are: central axis or insert axis K-L of rocket nozzle insert 10, which axis is coincident with the longitudinal axis of the nozzle proper (not shown); the relative positions of the entrance end and the exit end of the nozzle proper (not shown); and, as indicated by arrows, the direction of the gaseous flow from the entrance end to the exit end, if in fact nozzle insert 10 was positioned within a nozzle (not shown).

Still with reference to FIG. 1, typical and relative dimensions of three of the surfaces of nozzle insert 10 are approximately as follows: entrance end fare 11A, 1.1 inches; external longitudinal surface 11B, 1.24 inches; exit end face 11C, 1.25 inches. The fourth surface 11D is an arc formed by radius R1 which is of a length of 1.6 inches, the geometric center of the circle of which is 2.5 inches from nozzle central axis K-L and E horizontal distance, approximately 0.35 inches, from the edge of exit end face 11C of nozzle insert 10. The thickness of pyrolytic graphite coating 12 is 0.08 inch. It is to be noted that these dimensions are set forth merely as illustrative and not by way of any limitation, and that they are given primarily to assist in laying a foundation for the discussion, to be made later herein, as to the positions and dimensions of circumferential stress relief grooves 20 and 30.

Figure 2:
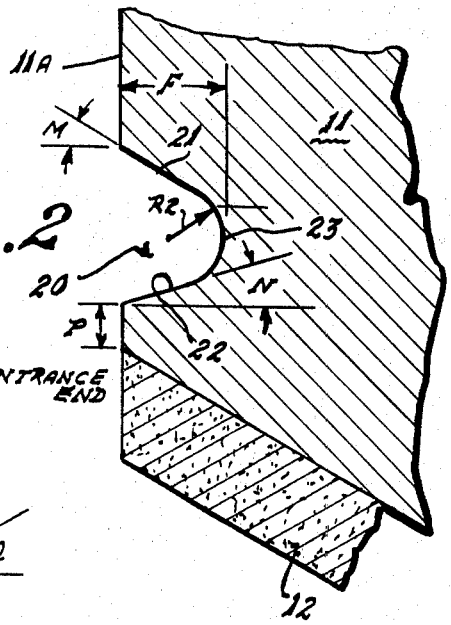
FIG. 2 is an enlarged side elevation view, in cross section and in schematic form, of a portion of the nozzle insert shown in FIG. 1.

In FIG. 2 is shown, in enlargement and in cross-section, a schematic representation of a side elevation view of a portion of entrance end face 11A of the nozzle insert 10 which is depicted in FIG. 1. Entrance end face circumferential stress relief groove 20, shown in FIG. 2, is shaped and defined by upper face 21, lower face 22 and, interposed therebetween, by bottom face 23. Also shown is PG coating 12 which is 0.08 inch thick.

Still with reference to FIG. 2, therein is shown circumferential stress relief groove 20 as it would be typically dimensioned and positioned in view of the dimensions, as set forth above, of surfaces 11A, 11B and 11C of nozzle insert 10 and the formation of surface 11D of the same insert 10. More specifically, groove 20 has a depth F which is preferably in the range of 0.070–0.080 inch, and a width near bottom face 23 preferably in the range of from 0.060 inch to 0.080 inch. Groove lower face 22 is sloped or inclined at an angle N of 15° at, to and above nozzle insert central axis K-L, FIG. 1. As a related matter, length P on entrance face 11A is preferably from 0.030–0.040 inch. Groove bottom face 23 has a radius R2 of preferably from 0.030 to 0.040 inch. Groove upper face 21 is sloped and inclined at an angle M of 30° at, to and above nozzle insert central axis K-L, FIG. 1.

Figure 3:
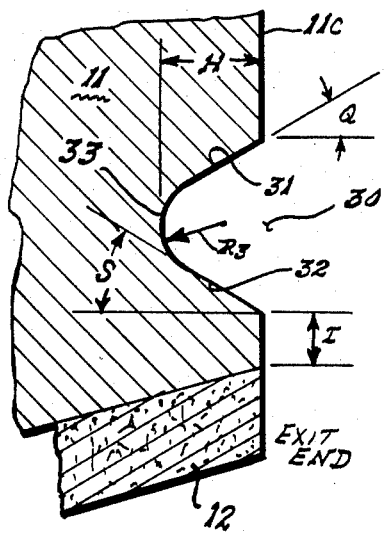
FIG. 3 is an enlarged side elevation view, also in cross-section and in schematic form, of another portion of the nozzle insert shown in FIG. 1.

FIG. 3 is an enlarged side elevation view, in cross-section and in schematic form, of a portion of exit end face 11C of nozzle insert 10, FIG. 1. Exit end face circumferential stress relief groove 30, shown in FIG. 3, is shaped and defined by upper face 31, lower face 32 and, interposed therebetween, by bottom face 33. Also shown is PG coating 12 which is 0.08 inch thick.

Still with reference to FIG. 3, therein is shown circumferential stress relief groove 30, also as it would be typically dimensioned and positioned in view of the dimensions, as set forth heretofore, of surfaces 11A, 11B and 11C of nozzle insert 10 and in view of the formation of surface 11D of insert 10. Groove 30 has a depth H in the range of 0.070–0.080 inch and a width near bottom face 33 in the range of 0.060–0.080. Groove lower face 32 is sloped or inclined at an angle S of 30° at, to and above nozzle insert central axis K-L, FIG. 1. Length I on entrance face 11C is preferably from 0.030–0.040 inch. Groove bottom face 33 has a radius R3 of preferably from 0.030 to 0.040 inch. Groove upper face 31 is sloped and inclined at an angle Q of 30° to and above nozzle insert central axis K-L, FIG. 1.

The circumferential stress relief grooves 20, FIGS. 1 and 2, and 30, FIGS. 1 and 3, may be formed by any suitable means, such as machining, with each groove 20 and 30, FIGS. 1 and 3, defining a separate circle the geometric center of each of which is on the central axis K-L, FIG. 1, of the rocket nozzle insert 10, FIG. 1, which central axis K-L is coincident with the longitudinal axis of the rocket nozzle (not shown) of which the insert is a component part.

MODE OF OPERATION OF THE PREFERRED EMBODIMENT

My invention operates on the principle, and is based upon the phenomenon, that if substrate material 11, FIG. 1, has flexibility near the free-ends, i.e. the ends formed respectively by surfaces 11A and 11D, FIG. 1, and by surface 11C and 11D, FIG. 1, and if the PG coating 12, FIGS. 1–3, deforms insert 10, FIG. 1, slightly, then high interlaminar stresses are not developed and delamination of PG coating 12, FIGS. 1–3, does not result.

Stated another way, circumferential stress relief grooves 20 and 30, FIGS. 1–3, give flexibility to substrate material 11, FIG. 1, near the free-ends of the insert 10, FIG. 1. These grooves permit the deposition of a PG coating, such as 12, FIGS. 1–3, of a thickness in excess of 0.06 inch; and when the insert is in use, i.e., in operation in the rocket nozzle (not shown), these grooves also permit the PG coating, such as 12, FIGS. 1–3, to deform the insert, such as 10, FIG. 1, slightly. Thereby, as stated above, high interlaminar stresses are not developed and delamination of the PG coating, such as 12, FIGS. 1–3, does not ccour.

It is here emphasized that the specific location and the exact dimensions of circumferential stress relief grooves 20 and 30, FIGS. 1–3, as set forth heretofore, are for illustrative purposes, and are not by way of any limitation. In essence, the grooves, such as 20 and 30, FIGS. 1–3, must be positioned and must be of a size sufficient to permit minor flexibility of the insert, such as 10, FIG. 1, at and near the PG coating-substrate material interface. Grooves 20 and 30, FIGS. 1–3, accomplish that objective with regard to insert 10, FIG. 1.

It is to be appreciated that, while there has been shown and described the fundamental features of the invention, as applied to a preferred embodiment of the inventive concept, it is to be understood, and it is obvious, that various substitutions and changes may be made by those of ordinary skill in the art without departing from the spirit of the invention.

What is claimed is:

1. A method of preventing the delamination of the pyrolytic graphite coating of a rocket nozzle insert having a central axis and having a pyrolytic graphite coating on the internal longitudinal surface of the substrate material portion thereof, comprising the steps of:

a. forming, for stress relief, a circumferential groove on the entrance end face of the substrate material portion of the rocket nozzle insert, with the groove being located near the pyrolytic graphite coating-substrate material interface of the insert, and with the groove defining a circle the geometric center of which is on the central axis of the insert;

b. and, forming, for stress relief, a circumferential groove on the exit end face of the substrate material portion of the rocket nozzle insert, with the groove being located near the pyrolytic graphite coating-substrate materia interface of the insert, and with the groove defining a circle the geometric center of which is on the central axis of the insert;

whereby the grooves give flexibility to the insert at and near the pyrolytic graphite coating-substrate material interface.

2. The method, as set forth in claim 1, wherein each circumferential groove is formed having an upper face, a lower face and therebetween, a bottom face.

3. The method, as set forth in claim 2, wherein the said lower face of each circumferential groove is formed at a distance of from 0.030 to 0.040 inch from the pyrolytic graphite coating-substrate material interface.

4. The method, as set forth in claim 2, wherein each circumferential groove is formed having a depth of from 0.07 to 0.80 inch and, having a width, near the said bottom face, of from 0.060 to 0.080 inch.

5. The method, as set forth in claim 2, wherein said upper face of each circumferential groove is formed so as to be at an angle of 30° to the central axis of the insert.

6. The method, as set forth in claim 2, wherein said lower face of the circumferential groove in the entrance end face of the substrate material portion of the insert is formed so as to be at an angle of 15° to the central axis of the insert.

7. The method, as set forth in claim 2, wherein said lower face of the circumferential groove in the exit end face of the substrate material portion of the insert is formed so as to be at an angle of 30° to the central axis of the insert.

8. The method, as set forth in claim 2, wherein said bottom face of each circumferential groove is formed and defined by a radius of from 0.030 to 0.040.

* * * * *